United States Patent
Baumgartner et al.

(10) Patent No.: US 8,444,360 B2
(45) Date of Patent: May 21, 2013

(54) SELF-DRILLING SCREW

(75) Inventors: Michael Baumgartner, Montlingen (CH); Albert Loichinger, Sax (CH)

(73) Assignee: Hilti Aktiengesellschaft, Schaan (LI)

( * ) Notice: Subject to any disclaimer, the term of this patent is extended or adjusted under 35 U.S.C. 154(b) by 448 days.

(21) Appl. No.: 12/378,687

(22) Filed: Feb. 17, 2009

(65) Prior Publication Data
US 2009/0232619 A1   Sep. 17, 2009

(30) Foreign Application Priority Data
Mar. 13, 2008   (DE) .......................... 10 2008 000 652

(51) Int. Cl.
*F16B 25/10*   (2006.01)
*B23B 51/02*   (2006.01)

(52) U.S. Cl.
USPC ...................................... 411/387.8; 408/230

(58) Field of Classification Search
USPC ............. 411/386, 387.1, 387.2, 387.3, 387.4, 411/387.5, 387.6, 387.7, 387.8, 29; 408/227, 408/230
See application file for complete search history.

(56) References Cited

U.S. PATENT DOCUMENTS

| | | | | |
|---|---|---|---|---|
| 4,114,507 A * | 9/1978 | Fischer et al. | ............. | 411/387.7 |
| 4,125,050 A * | 11/1978 | Schwartzman et al. | ... | 411/387.8 |
| 4,147,088 A | 4/1979 | Whittaker | | |
| 4,407,620 A * | 10/1983 | Shinjo | ........................ | 411/387.7 |
| 4,568,229 A * | 2/1986 | Hulsey | ....................... | 411/387.8 |
| 4,599,024 A * | 7/1986 | Sano et al. | .................. | 411/387.8 |
| 4,708,557 A * | 11/1987 | Hashimoto | ................ | 411/387.8 |
| 4,730,969 A | 3/1988 | Dohl | | |
| 4,753,562 A * | 6/1988 | Hirayoshi | ................... | 411/387.6 |
| 4,793,756 A * | 12/1988 | Baumgartner | ............. | 411/387.7 |
| 5,078,554 A | 1/1992 | Kubota | | |
| 5,520,491 A * | 5/1996 | Miyagawa | ................. | 411/387.8 |
| 5,882,161 A * | 3/1999 | Birkelbach | ................ | 411/387.7 |
| 6,142,719 A * | 11/2000 | Daubinger et al. | ........ | 411/387.8 |
| 7,530,772 B2 | 5/2009 | Reinhardt | | |
| 2009/0097941 A1* | 4/2009 | Loichinger et al. | ........ | 411/387.5 |
| 2010/0028098 A1* | 2/2010 | Shaffer | ......................... | 408/230 |

FOREIGN PATENT DOCUMENTS

| | | |
|---|---|---|
| DE | 198 03 672 A1 | 8/1999 |
| DE | 202 09 767 U1 | 12/2003 |

OTHER PUBLICATIONS

DIN 1414-1:Nov. 2006.

* cited by examiner

*Primary Examiner* — Flemming Saether
(74) *Attorney, Agent, or Firm* — Abelman, Frayne & Schwab

(57) ABSTRACT

A self-drilling screw (10) has a thread-carrying shaft (11), a head (15) provided at one of its ends, and a drilling tip (12) provided at another of its ends, opposite the one end thereof, with the drilling tip (12) having first and second cutting edges (21, 22) and first and second chip channels (24, 25) associated with the first and second cutting edges (21, 22), respectively, beginning at first and second start points (26, 27) at the free end (14) of the drilling tip (12), and located on opposite first and second sides of the drilling tip (12), with the first and second start points (26, 27) being spaced from the center (Z) of the drilling tip (12) by a mean distance (X) corresponding to from 0.01 to 0.15 of the drilling tip diameter (D), and being spaced from each other by a maximum distance (Y) corresponding to from 0 to 0.8 of the mean distance (X).

7 Claims, 2 Drawing Sheets

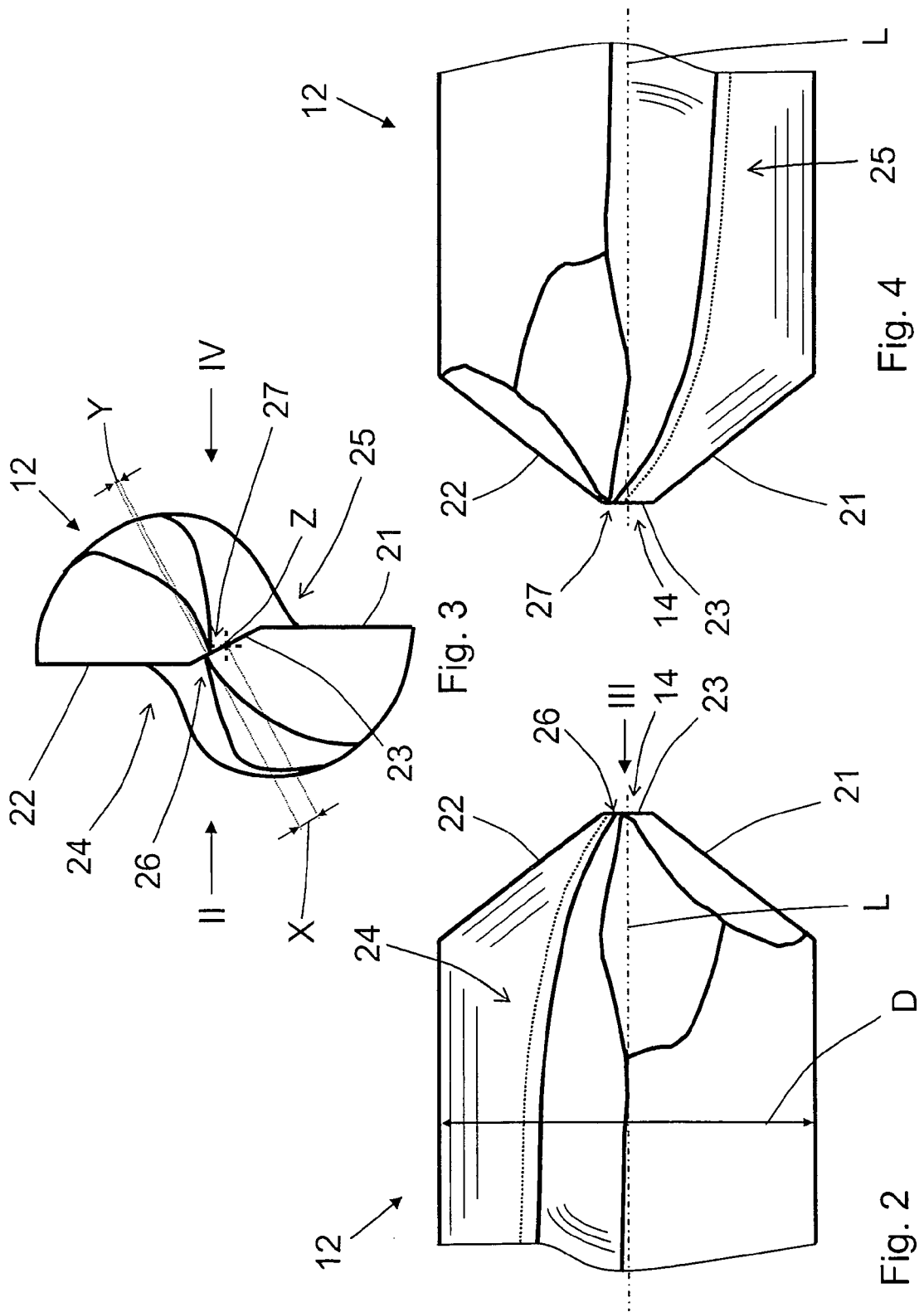

SELF-DRILLING SCREW

BACKGROUND OF INVENTION

1. Field of Invention

The present invention relates to a self-drilling screw carrying, at least in some regions, a thread, a head provided at one end of the shaft, and a drilling tip provided at another, opposite end of the shaft. The drilling tip has at least one first cutting edge, at least one second cutting edge, a first chip channel associated with the first cutting edge, beginning at a first start point at a free end of the drilling head, and located on a first side of the drilling tip, and a second chip channel associated with the second cutting edge, beginning at a second start point at the free end of the drilling tip, and located on a second side of the drilling tip opposite the first side. The drilling tip has a center located on the longitudinal axis of the screw defined by the shaft.

2. Description of Prior Art

Self-drilling screws of the type described above are used, e.g., for screwing metal sheets to metal beams primarily in roof and wall constructions for screwing trapezoidal and profiled metal sheets to steel girders. The self-drilling screw is provided with a drilling tip that drills a hole through the sheet and girder. Finally, the screw taps a thread and tightens the sheet and girder together.

German Publication DE 198 03 672 A1 discloses a self-drilling screw having a shaft, a head provided at one end of the shaft, and a drilling tip provided at another, opposite end of the shaft and having first cutting edge, and second cutting edge. The drilling tip has two chip channels extending, respectively, from respective cutting edges in the direction of the head along the longitudinal axis of the screw. The chip channels serve for removal material chips produced as a result of drilling. The start points of both chip channels on the respective cutting edges are arranged rotationally symmetrically on the drilling tip. Between the drilling tip and the head, the shaft of the self-drilling screw is provided with a tapping thread.

The drawback of the self-drilling screw of the type described above consists in that the drilled out material of a workpiece is squeezed in the center of the drilling tip, which lies on the longitudinal axis of the screw, and must be removed in a deformed state. This requires application of a high force by the user when pressing the self-drilling screw against a workpiece with a screw-driving tool.

Accordingly, an object of the present invention is to eliminate the above-mentioned drawback of the known self-drilling screw.

SUMMARY OF THE INVENTION

This and other objects of the present invention, which will become apparent hereinafter, are achieved by providing a self-drilling screw of the type discussed above in which the first and second start points are located opposite each other at a mean distance from the center of the drilling tip, with a maximum distance therebetween, with the mean distance corresponding to from 0.01 to 0.15 of the diameter of the drilling tip and the maximum distance corresponding to from 0 to 0.8 of the mean distance.

As a result of such a position of the start points, with reference to the longitudinal axis of the drilling tip, an asymmetrical tip geometry is produced. With such a geometry, at least one of the cutting edges (sidewise first and second cutting edges and a third cutting edge located in the tip center) is located on the chip channels in the region of the drilling tip center. As a result, the material, which is removed in the center, is not squeezed by the drilling tip but rather is directly removed through the chip channels on both sides of the drilling tip center.

It is particularly advantageous when the mean distance corresponds to from 0.03 to 0.06 of the diameter of the drilling tip. Such a distance provides for an optimal design of the drilling tip with regard to its vibrations and removal of chips in the center region.

A high drilling output is achieved when the drilling tip is provided with a third cutting edge located between the first and second cutting edges and extending through the center of the drilling tip, with the start points being located, respectively, on one side of the third cutting edge.

The novel features so the present invention, which are considered as characteristic for the invention, are set forth in the appended claims. The invention itself, however, both as to its construction and its mode of operation, together with additional advantages and objects thereof, will be best understood from the following detailed description of preferred embodiment, when read with reference to the accompanying drawings.

BRIEF DESCRIPTION OF THE DRAWINGS

The drawings show:

FIG. 2 a side view of a detail II of the self-drilling screw shown in FIG. 1 in direction II in FIG. 3;

FIG. 3 an end view of the free end of the drilling tip of the inventive self-drilling screw in direction III in FIG. 2; and FIG. 4 a side view of a detail II of the self-drilling screw shown in FIG. 1 in direction IV in FIG. 3.

DETAILED DESCRIPTION OF THE PREFERRED EMBODIMENT

Figure 1:
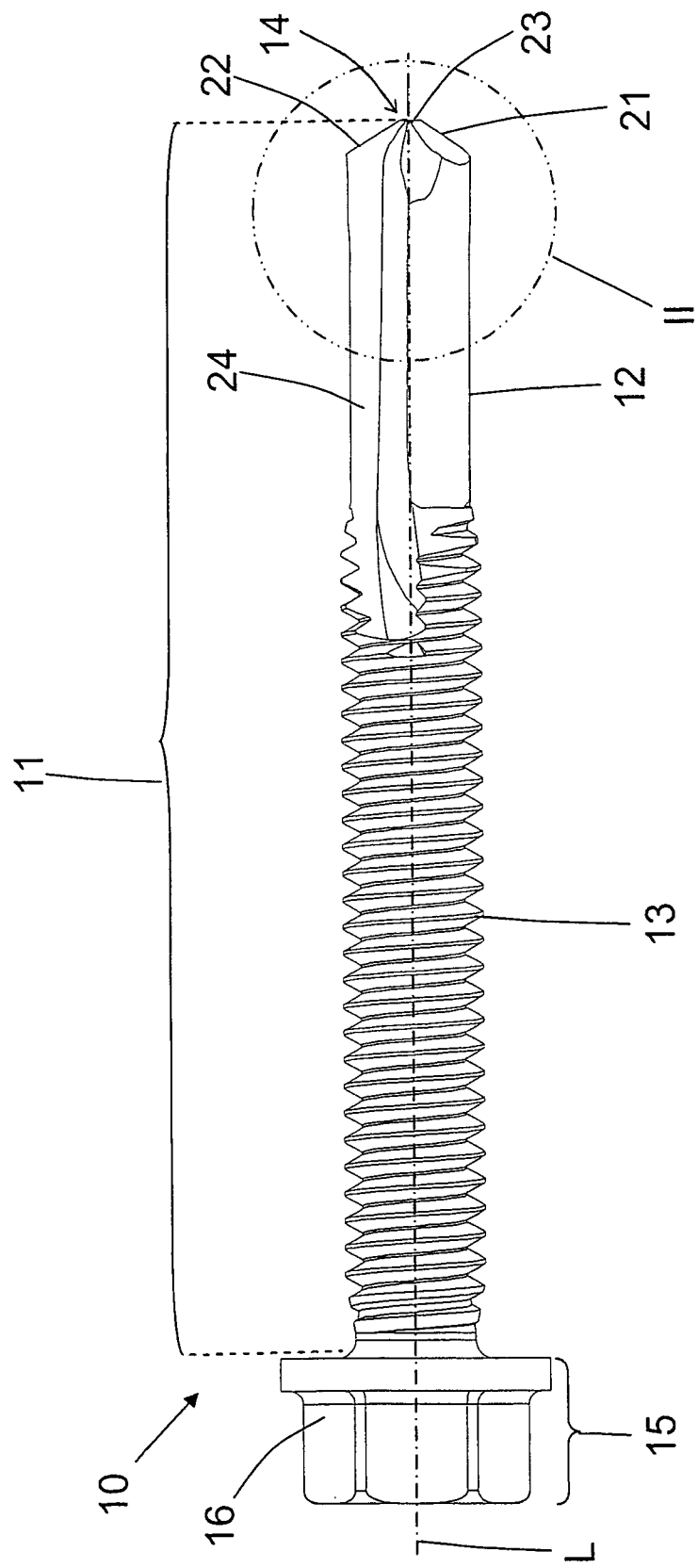
FIG. 1 a side view of a self-drilling screw according to the present invention.

A self-drilling screw 10 according to the present invention which is shown in FIGS. 1-4, has a shaft 11 carrying a thread 13 and having, in one of its end regions, a drilling tip 12 and, at its end opposite the drilling tip 12, a head 15. A longitudinal axis L of the self-drilling screw 10 defines an axial direction of the self-drilling screw 10. The head 15 of the self-drilling screw 10 has a rotation-transmitting element 16 in form of a polygon for a screw-driving tool such as a screw-driving bit or wrench.

The drilling tip 12 has, at its free end, at least one first cutting edge 21 and at least one second cutting edge 22 which are arranged at an angle to each other. In the embodiment shown in the drawings, a third cutting edge 23 is arranged between the first cutting edge 21 and the second cutting edge 22. The third cutting edge 23 crosses the center Z of the drilling tip 12 which lies on the longitudinal axis L.

In the drilling tip 12, there is provided a first chip channel 24 and a second chip channel 25. Both chip channels 24, 25 extend from the free end 14 of the drilling tip 12 in the direction of the head 15 along the longitudinal axis L of the self-drilling screw 10. The first chip channel 24 is associated with the first cutting edge 21 and begins at the free end 14 at a start point 26 located on a first side of the drilling tip 12. The second chip channel 25 is associated with the second cutting edge 22 and begins at the free end 14 at a start point 27 located on a second side of the drilling tip 12 opposite the first side (see in particular FIG. 3). Both start points 26, 27 lie opposite each other at a maximum distance Y from each other and both are arranged at a mean distance X from the center Z of the drilling tip 12. The mean distance X corresponds to from 0.01 to 0.15 of the diameter D of the drilling tip 12, and the distance Y corresponds to from 0 to 0.8 of the mean distance X (see in particular FIG. 3). Preferably, the mean distance X corresponds to from 0.03 to 0.06 of the diameter D. The mean distance X is an arithmetic mean of distances of the first start point 26 and the second start point 27 to the center Z of the drilling tip 12.

Though the present invention was shown and described with references to the preferred embodiment, such is merely illustrative of the present invention and is not to be construed as a limitation thereof, and various modifications of the present invention will be apparent to those skilled in the art. It is, therefore, not intended that the present invention be limited to the disclosed embodiment or details thereof, and the present invention includes all variations and/or alternative embodiments within the spirit and scope of the present invention as defined by the appended claims.

What is claimed is:

1. A self-drilling screw (10), comprising a shaft (11) defining a longitudinal axis (L) of the screw (10) and carrying, at least in some regions thereof, a thread (13); a head (15) provided at one end of the shaft (11); and a drilling tip (12) provided at another, opposite end of the shaft (11) and having a diameter (D), the drilling tip (12) having at least one first cutting edge (21), at least one second cutting edge (22), a first chip channel (24) associated with the at least one first cutting edge (21), beginning at a first start point (26) at a free end (14) of the drilling tip (12), and located on a first side of the drilling tip (12), and a second chip channel (25) associated with the at least one second cutting edge (22), beginning at a second start point (27) at the free end (14) of the drilling tip (12), and located on a second side of the drilling tip (12) opposite the first side, and the drilling tip (12) having a center (Z) located on the longitudinal axis (L) of the screw (10), the first start point (26) being spaced by a first distance from the center (Z) of the drilling tip (12) and the second start point (27) being spaced by a second distance from the center (Z) of the drilling tip (12) different from the first distance and on the same side of the center, with the mean value (X) of the first distance and the second distance being equal to from 0.01 to 0.15 of the diameter (D) of the drilling tip (12), and a distance (Y) between the first and second start points (26, 27) being equal at most to 0.12 of the diameter of the drilling tip.

2. A self-drilling screw according to claim 1, wherein the mean distance (X) corresponds to from 0.03 to 0.06 of the diameter (D) of the drilling tip (12).

3. A self-drilling screw according to claim 1, wherein the drilling tip (12) has a third cutting edge (23) located between the first and second cutting edges (21, 22) and extending through the center (Z) of the drilling tip (12), with the start points (26, 27) being located, respectively, on one side of the third cutting edge (23).

4. A self-drilling screw according to claim 3, wherein the drilling tip has a third cutting edge (23) extending perpendicular to the longitudinal axis.

5. A self-drilling screw (10), comprising a shaft (11) defining a longitudinal axis (L) of the screw (10) and carrying, at least in some regions thereof, a thread (13); a head (15) provided at one end of the shaft (11); and a drilling tip (12) provided at another, opposite end of the shaft (11) and having a diameter (D), the drilling tip (12) having at least one first cutting edge (21), at least one second cutting edge (22), a first chip channel (24) associated with the at least one first cutting edge (21), beginning at a first start point (26) at a free end (14) of the drilling tip (12), and located on a first side of the drilling tip (12), and a second chip channel (25) associated with the at least one second cutting edge (22), beginning at a second start point (27) at the free end (14) of the drilling tip (12), and located on a second side of the drilling tip (12) opposite the first side, and the drilling tip (12) having a center (Z) located on the longitudinal axis (L), wherein the drilling tip (12) has a third cutting edge (23) located between the first and second cutting edges (21, 22) and extending through the center (Z) of the drilling tip (12), wherein the first start point (26) is spaced from the center (Z) of the drilling tip (23) by a first distance, and the second start point (27) is spaced from the center (Z) of the drilling tip (23) by a second distance different from the first distance, and wherein the first start point (26) and the second start point (27) are located, respectively, on one side of the third cutting edge (23) and on the same side of the center.

6. A self-drilling screw according to claim 5, wherein the mean distance (X) is equal to from 0.01 to 0.15 of the diameter (D) of the drilling tip (12).

7. A self-drilling screw according to claim 5, wherein the third cutting edge (23) extends perpendicular to the longitudinal axis.

* * * * *